(12) United States Patent
Saadani et al.

(10) Patent No.: US 9,071,292 B2
(45) Date of Patent: Jun. 30, 2015

(54) METHOD OF TRANSMITTING A DIGITAL SIGNAL IN A DISTRIBUTED SYSTEM, AND A CORRESPONDING PROGRAM PRODUCT AND RELAY DEVICE

(75) Inventors: Ahmed Saadani, Issy les Moulineaux (FR); Michel Nahas, Kosba El-Koura (LB); Ghaya Rekaya, Antony (FR)

(73) Assignee: France Telecom, Paris (FR)

( * ) Notice: Subject to any disclaimer, the term of this patent is extended or adjusted under 35 U.S.C. 154(b) by 529 days.

(21) Appl. No.: 13/522,108

(22) PCT Filed: Jan. 13, 2011

(86) PCT No.: PCT/FR2011/050065
§ 371 (c)(1),
(2), (4) Date: Nov. 7, 2012

(87) PCT Pub. No.: WO2011/086332
PCT Pub. Date: Jul. 21, 2011

(65) Prior Publication Data
US 2013/0051408 A1     Feb. 28, 2013

(30) Foreign Application Priority Data
Jan. 13, 2010 (FR) ..................... 10 50200

(51) Int. Cl.
*H04L 27/28* (2006.01)
*H04J 11/00* (2006.01)
(Continued)

(52) U.S. Cl.
CPC ............... *H04B 7/024* (2013.01); *H04B 7/026* (2013.01); *H04L 1/0077* (2013.01); *H04L 1/0668* (2013.01); *H04L 5/0007* (2013.01); *H04L 2001/0097* (2013.01)

(58) Field of Classification Search
CPC .................. H04B 7/024; H04B 7/026; H04L 2001/0097; H04L 1/0668; H04L 5/0007; H04L 1/0077
USPC .......................... 370/537, 295, 340
See application file for complete search history.

(56) References Cited

U.S. PATENT DOCUMENTS

2003/0053487 A1 *  3/2003  Hamalainen et al. ......... 370/477
2006/0120477 A1 *  6/2006  Shen et al. .................... 375/267

FOREIGN PATENT DOCUMENTS

WO      2008057594 A2      5/2008
WO  WO 2008057594 A2 *   5/2008
(Continued)

OTHER PUBLICATIONS

S.M. Alamouti, "A Simple Transmitter Diversity Scheme for Wireless Communications," IEEE J. Select. Areas Commun., vol. 16, pp. 1451 1458, Oct. 1998.

(Continued)

*Primary Examiner* — Jung Park
*Assistant Examiner* — Albert Shih
(74) *Attorney, Agent, or Firm* — David D. Brush; Westman, Champlin & Koehler, P.A.

(57) ABSTRACT

A method and apparatus are provided for transmitting frames of N>2 symbols for use in a distributed system having at least two transmitter nodes. The method includes circularly permutating a frame of N symbols; multiplying m first permutated symbols by a phase coefficient $\phi \neq 1$, for $0 < m \leq [N/2]+1$; and one of the nodes transmitting the frame including the multiplied permutated symbols and another of the nodes transmitting the frame of N symbols.

13 Claims, 2 Drawing Sheets

(51) Int. Cl.
  *H04B 7/02*  (2006.01)
  *H04L 1/00*  (2006.01)
  *H04L 1/06*  (2006.01)
  *H04L 5/00*  (2006.01)

(56) References Cited

FOREIGN PATENT DOCUMENTS

| WO | 2008066888 A1 | | 6/2008 |
| WO | WO 2008066888 A1 | * | 6/2008 |

OTHER PUBLICATIONS

M.O. Damen and A.R. Hammons, "Delay-Tolerant Distributed TAST Codes for Cooperative Diversity," IEEE Transactions on Information Theory, special issue on cooperative diversity, vol. 53, pp. 3755 3773, Oct. 2007.

John A.C. Bingham, "Multicarrier Modulation for Data Transmission: An Idea Whose Time Has Come", May 1990, IEEE Communications Magazine.

V. Tarokh, N. Seshadri, and A.R. Calderbank, "Space-Time Codes for High Data Rate Wireless Communication: Performance Criterion and Code Construction," IEEE Transactions on Informormation Theory, vol. 44, pp. 744 765, Mar. 1998.

J-C. Belfiore, G. Rekaya and E. Viterbo, "The Golden Code: A 2×2 Full-Rate Space-Time Code with Non-Vanishing Determinants", IEEE International Symposium on Information Theory (ISIT), Chicago, USA, Jul. 2004.

International Search Report and Written Opinion dated May 6, 2011 for corresponding International Application No. PCT/FR2011/050065, filed Jan. 13, 2011.

French Search Report and Written Opinion dated Aug. 25, 2010 for corresponding French Application No. FR 1050200, filed Jan. 13, 2010.

International Preliminary Report on Patentability and English translation of the Written Opinion dated Aug. 7, 2012 for corresponding International Application No. PCT/FR2011/050065, filed Jan. 13, 2011.

* cited by examiner

METHOD OF TRANSMITTING A DIGITAL SIGNAL IN A DISTRIBUTED SYSTEM, AND A CORRESPONDING PROGRAM PRODUCT AND RELAY DEVICE

CROSS-REFERENCE TO RELATED APPLICATIONS

This Application is a Section 371 National Stage Application of International Application No. PCT/FR2011/050065, filed Jan. 13, 2011, which is incorporated by reference in its entirety and published as WO 2011/086332 on Jul. 21, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of transmitting coded data in a wireless or mobile type telecommunications network. Within this field, the disclosure relates more particularly to space-time codes, to the corresponding methods, and to coders for asynchronous co-operative communications. Such communications are transmitted by relays of a cellular network, by a network of sensors, by an ad hoc network, or by various antennas of a distributed network. Each node under consideration of the network has only one antenna for performing both transmission and reception. The signal received by the destination is thus transmitted by at least two nodes of the network which transmit or relay the signal in asynchronous manner, i.e. without any strong constraint on synchronization. The transmission implements a coding technique in which the coding is distributed in space since it relies on a plurality of nodes, and is distributed in time since it requires a plurality of symbol times.

BACKGROUND

In wireless networks, the transmitted signal may suffer high levels of attenuation as a result of the fading phenomenon.

In order to combat this phenomenon, one known technique consists in transmitting a plurality of copies of the same signal in order to create transmission diversity, thereby making it possible to combat the harmful effects of fading effectively. The diversity may be spatial; it is obtained by transmitting signals from different locations. The destination then receives versions of the signal that have been subjected to fading in independent manners.

One of the transmission techniques that enable advantage to be taken of spatial diversity is space-time coding. In a transmission system having a plurality of transmit and/or receive antennas, the use of a space-time code makes it possible to perform space multiplexing (between antennas) and time multiplexing of the information symbols to be transmitted so as to take best advantage of the degrees of freedom of the system. Space-time codes make it possible to take advantage of the gains made available by multiplexing (increasing the data rate and thus the coding rate of the system) and of the diversity of multi-antenna systems. By way of illustration, a multi-antenna system comprises $N_t$ transmit antennas and $N_r$ receive antennas. The coding rate is defined as $r=n/T$, where n is the number of information symbols sent during the time T. The maximum coding rate of a space-time code is equal to $r=\min(N_t,N_r)$. Let C be the following matrix of the space-time code of dimension $N_t \times T$:

$$C = \begin{bmatrix} c_{11} & \cdots & c_{1T} \\ \vdots & \ddots & \vdots \\ c_{N_t 1} & \cdots & c_{N_t T} \end{bmatrix}$$

Each row i of the matrix feeds a transmit antenna i. Each element $c_{ij}$ of the row i is a linear combination of information symbols and it is transmitted at instant jT. The pairwise error probability $\Pr\{Z \neq Z'\}$ is defined as the probability that the receiver decodes the code word $Z' \neq Z$ when the code word Z was transmitted and the code word Z is a code word of the code C. This probability depends on two criteria relating to the structure of the code matrix C. Consider a matrix B of differences between Z and Z':

$$B = \begin{bmatrix} z_{11} - z'_{11} & \cdots & z_{1T} - z'_{1T} \\ \vdots & \ddots & \vdots \\ z_{N_t 1} - z'_{N_t 1} & \cdots & z_{N_t T} - z'_{N_t T} \end{bmatrix}$$

In reference [1] it is shown that in order to minimize the pairwise error probability, it is necessary for:

the rank of the matrix $B.B^H$, for the set of all matrix pairs ZZ', to be a maximum in order to guarantee maximum diversity. This defines the rank criterion of the code; and the determinant of the matrix $B.B^H$, for the set of all the matrix pairs ZZ' to be maximized in order to minimize the pairwise error probability. This thus defines the determinant criterion of the code.

An example of a space-time code for $N_t=2$ and $N_r=1$ is described in Alamouti [2]. At a first instant, the symbols $s_1$ and $s_2$ are transmitted respectively by transmit antennas $T_1$ and $T_2$, and then at a second instant, the symbols $-s^*_2$ and $s^*_1$ are transmitted by the transmit antennas $T_1$ and $T_2$. In matrix form, the Alamouti code is represented in the following form:

$$C_{Alamouti} = \begin{bmatrix} s_1 & -s^*_2 \\ s_2 & s^*_1 \end{bmatrix}$$

The Alamouti code makes it possible to achieve the maximum diversity equal to two since each symbol is transmitted in two independent versions (one per antenna). This observation is easily verified using the rank criterion. In addition, the code presents a full coding rate of one, since it makes it possible to send two symbols (n=2) during two symbol times (T=2).

So-called multiple-input multiple-output (MIMO) multi-antenna transmission systems provide space diversity, but the antennas need to be located at a common node of the network. Co-locating transmit and/or receive antennas does not give rise to difficulties with base stations. However, when the transmitters are terminals (mobile terminals in a cellular network, sensors in a network of sensors, . . . ), such co-location gives rise to constraints of size, of cost, and of hardware limitations.

So-called "co-operative" communications enable terminals having only one antenna to benefit from space diversity which is then referred to as "co-operation diversity": single-antenna nodes of a multi-user network share their antennas so as to create a virtual multi-antenna system. Thus, such a new virtual MIMO system can exploit the known techniques for improving transmission quality that are used in MIMO systems. In co-operative systems with distributed transmission (e.g. using relays), the distributed antennas may be considered as being virtual multiple antennas that transmit to the destination. Consequently, the space-time codes can be used in a distributed manner.

Several earlier works address space-time coding for synchronous distributed systems. Under such circumstances, the frames are synchronized at relay level and at destination level. Nevertheless, given the imperfections of synchronization methods, the time delays due to multiple hops, the nature of the relays, cost, and the complexity of synchronization, synchronization is not always effective with antennas distributed over different nodes of the network. An absence of synchronization destroys synchronous code structures and leads to a loss of their properties (e.g. the rank criterion). By way of example, mention may be made of the Alamouti code. If the antenna $T_2$ has a time delay of one symbol time relative to the antenna $T_1$, then the code matrix perceived by the receiver becomes:

$$\begin{bmatrix} s_1 & -s_2^* & 0 \\ 0 & s_2 & s_1^* \end{bmatrix}$$

Under such circumstances, the determinant is equal to: $|ds_1|^4 + 2|ds_1|^2|ds_2|^2$ which becomes zero (vanishes) if and only if the symbol $s_1$ is the same for two different code words, $ds_j$ being the difference between the symbols at the position j for two code words.

In order to retain rank properties (which guarantee the maximum degree of diversity) and in order to retain the determinant of space-time codes when the signals received at the antennas are asynchronous, two main solutions have been proposed.

The first solution [3] describes designing asynchronous space-time codes that are robust against loss of synchronization and that reduce the cost of synchronization.

Consider two nodes $T_2$ and $1_2$, each having only one antenna that transmits to a destination in asynchronous manner, as shown in FIG. 1. Because of the distributed nature of the network, respective different time delays are introduced by the two nodes $T_2$ and $T_2$. The respective time delays at the destination D between the arrival of the signal coming from $T_1$ and the arrival of the signal coming from $T_2$ are written $\tau_2$ and $\tau_2$. The relative time delay between the nodes is written $\Delta=\tau_2-\tau_1$. Without loss of generality, it can be considered that $\tau_2 \leq \tau_1$, so that $\Delta \geq 0$. Without loss of generality, it can be considered that the relative time delay $\Delta$ is absorbed by the multiple-path effect and that it is an integer multiple of the symbol time. It is assumed that the time delays are known by the destination D but not necessarily by the nodes $T_1$ and $T_2$.

In the situation corresponding to FIG. 1, the authors of [3] have proposed a modified version of the Alamouti code in order to combat the effects of non-synchronization between the two nodes $T_1$ and $T_2$. The proposed code matrix is:

$$C_{Alamouti}^D = \begin{bmatrix} s_1 & -s_2^* & -s_2^* \\ s_2 & s_1^* & s_1^* \end{bmatrix}$$

If a time delay exists between receiving the two rows at the destination D, the determinant of the code matrix vanishes only if the two symbols $s_1$ and $s_2$ are the same for both code words; this new form of the Alamouti code can accommodate a lack of synchronization between the two transmitter nodes $T_2$ and $T_2$. Nevertheless, the fact of repeating the same symbols twice increases the size of the code and leads to a loss in its coding rate which becomes equal to r=2/3.

The second solution [4] recommends using the orthogonal frequency division multiplexing (OFDM) technique to eliminate the effect of time synchronization by using a cyclic prefix. Using the OFDM technique in that way serves to combat the effects of desynchronization in a wireless communications network by considering time delay as being due to multiple paths. Nevertheless, although that technique enables the frames from different antennas to be synchronized, it presents the following drawbacks:

at the outlet from the OFDM receiver, the signal transmitted by the two antennas has diversity equal to one even if it has taken two different paths;

in order to eliminate interference between the transmitted blocks, it is necessary to use a guard interval or a cyclic prefix that causes useful data rate to be lost and thus loses coding rate. In addition, in order to be certain to be able to synchronize the frames coming from antennas of the network, it is necessary for the guard interval or the cyclic prefix that is introduced to be of a length that is longer than the time delays between the antennas. For this purpose, it is necessary to increase the size of the guard interval or of the cyclic prefix so that it is greater than the maximum time delay that might be obtained between the antennas of the network; this also reduces coding rate; and certain wireless communications systems do not make use of OFDM, and mention may be made for example of time-division multiple access (TDMA) or of code-division multiple access (CDMA) systems.

SUMMARY

An embodiment of the invention proposes a transmission technique enabling space-time coding to be improved for distributed systems that are not necessarily synchronous, nor always asynchronous.

An embodiment of the invention provides a method of transmitting frames of N>2 symbols $S_i$ for use in a distributed system having at least two transmitter nodes, the method comprising:

circularly permutating a frame of N symbols $S_i$;

multiplying m first permutated symbols by a phase coefficient $\phi \neq 1$, for $0 < m \leq [N/2]+1$; and one of the nodes transmitting the frame comprising the multiplied permutated symbols and another of the nodes transmitting the frame of N symbols $S_i$.

An embodiment of the invention also provides a distributed transmission system having at least three nodes including two transmitter nodes for transmitting frames of N symbols.

Thus, a system of an embodiment of the invention comprises:

circular permutation means for circularly permutating a frame of N symbols; and multiplier means for multiplying m first permutated symbols by a phase coefficient $\phi \neq 1$, for $0 < m \leq [N/2]+1$;

and such that:
one of the transmitter nodes has means for transmitting the frame of multiplied permutated symbols; and
another transmitter node has means for transmitting the frame of N symbols.

The two transmitter nodes transmit to a destination. The destination thus receives the frame of symbols transmitted by the first node (one of the nodes) and the frame of symbols that have been permutated and weighted by φ as transmitted by the second node (the other node), thereby determining a new space-time code.

The circular permutation preferably shifts the symbols m ranks to the right, typically with m=[N/2] when N is even and typically with m=[N/2] or m=[N/2]+1 when N is odd, [x] being the integer portion of x. Thus, regardless of the time delays $\tau_1$ and $\tau_2$ for transmission between a node and the destination, the space-time code distributed between the first and second nodes gives full diversity of two over a range of relative time delays given by $\Delta \in \{-\Delta_{max}, +\Delta_{max}\}$ for N even and over a range of relative time delays given by $\Delta \in \{(-\Delta_{max}+1), +\Delta_{max}\}$ or by $\Delta \in \{-\Delta_{max}, (+\Delta_{max}-1)\}$ for odd N depending on whether m=[N/2] or m=[N/2]+1, with:

$$\Delta_{max} = \left[\frac{N+1}{2}\right] - 1.$$

The new code makes it possible to provide a new form of space diversity, referred to as "co-operation diversity", in wireless networks in which the nodes are not necessarily synchronized.

In a particular implementation, a transmission method further comprises determining first and second new frames comprising respective symbols $X_i$ and $X'_i$ that are constructed by combining symbols $S_i$, the constructed symbols $X_i$ and $X'_i$ determining two different points of a given constellation, the circular permutation and the multiplication being applied to the second new frame of symbols $X'_i$ prior to one of the nodes transmitting the permutated and multiplied symbols, while the other node transmits the first new frame.

This construction of new symbols $X_i$ and $X'_i$ makes it possible to obtain constellation diversity, since each transmitter transmits a configuration of the same symbols corresponding to a different point of a constellation. The pairwise error probability of the code becomes smaller than when the method transmits the symbols $S_i$ for the same coding rate. By applying the circular permutation and the weighting to a combination of the symbols $S_i$ instead of directly to the symbols $S_i$, it becomes possible to increase the robustness of the transmission method.

In a particular implementation, a transmission method is such that the first new frame comprises the symbols $X_i$ such that $X_i = S_{2i-1} + \theta \cdot S_{2i}$ and the second new frame comprises the symbols $X'_i$ such that $X'_i = S_{2i-1} - \theta \cdot S_{2i}$.

$$N' = \frac{N}{2}$$

is the size of the new frames of symbols $X_i$ and $X'_i$ that are to be transmitted; it is the length of the new code. The new space-time code thus makes it possible to guarantee full diversity in a network having two transmitters transmitting to the same destination for a time delay between the two transmitters lying in a range $\Delta \in \{-\Delta_{max}, +\Delta_{max}\}$ that varies as a function of the size code N'. For a code of even length, the absolute value of the maximum time delay that the code can accommodate is:

$$\Delta_{max} = \frac{N'}{2} - 1.$$

If N' is odd, the maximum delay that can be accommodated by the code is the integer portion of dividing N' by two. Thus, in order to increase the range that can be accommodated, it suffices to increase the size N' of the code.

In a particular implementation, a transmission method is such that $$\theta = \exp\left(j \cdot \frac{\pi}{4}\right).$$

This value for the angle of rotation minimizes the pairwise error probability for a four or sixteen quadrature amplitude modulated (4 QAM or 16 QAM) type constellation of the symbols $S_i$.

In a particular implementation, a transmission method is of the OFDMA type and is such that the frame transmitted by a node is multiplexed on one of the subcarriers.

This implementation is well adapted for OFDMA type asynchronous co-operative systems. When there are two nodes, this implementation corresponds to a space-time code $$C^{CP} = \begin{bmatrix} X_1 & X_2 & X_3 & X_4 & X_5 & X_6 & X_7 & X_8 \\ \varphi X'_5 & \varphi X'_6 & \varphi X'_7 & \varphi X'_8 & X'_1 & X'_2 & X'_3 & X'_4 \end{bmatrix}$$

that is distributed between the subcarriers of the two nodes: each row of the code is multiplexed on one of the subcarriers of the OFDM multiplexer of one of the nodes.

The space-time code $C^{CP}$ has as many rows as there are transmitter nodes. It makes it possible in extremely advantageous manner to reduce the constraints on synchronization between the nodes since it suffices for the relative delay Δ to belong to one of the ranges $[k.T_{ofdm}; k.T_{ofdm}+T_{pc}]$ for the destination to be able to decode the received code, where $T_{ofdm}$ is the duration of an OFDM symbol, k is an integer, and $T_{pc}$ is the duration of the cyclic prefix. In addition, the space-time code $C^{CP}$ serves to reduce the duration of the cyclic prefix by enabling it to be adapted to a single relative time delay Δ and not to the maximum value of the time delays between a node and a destination. With this single constraint on the cyclic prefix, it is always possible to decode the signal on reception with a diversity of two.

In a particular implementation, the system of an embodiment of the invention is such that each of the transmitter nodes has an OFDM multiplexer with a plurality of subcarriers and that multiplexes one of the frames on one of the subcarriers.

An embodiment of the invention also provides a relay for an OFDMA type distributed transmission system for implementing a transmission method according to an embodiment of the invention, and comprising:
an OFDM multiplexer having a plurality of subcarriers for multiplexing a frame of symbols on one of the subcarriers of the multiplexer.

An embodiment of the invention also provides a method of receiving frames of N symbols for use in a distributed system having at least three nodes including two transmitter nodes, the method comprising:

decoding a received frame resulting from the transmission of at least a first frame transmitted by the first transmitter node and at least a second frame transmitted by the second transmitter node using a space-time code for which the matrix comprises as many rows as there are transmitter nodes, the first row being identical to the first frame transmitted by the first transmitter node and the second row being constructed from the preceding row by applying a circular permutation to the symbols of the preceding row and by multiplying m of the permutated symbols by a phase coefficient $\phi \neq 1$, for $0<m \leq [N/2]+1$.

An embodiment of the invention also provides a receiver for receiving frames of N symbols, for use in a distributed system having at least three nodes including transmitter nodes and the receiver, the receiver comprising:

a decoder for decoding a received frame resulting form the transmission of at least a first frame transmitted by the first transmitter node and at least a second frame transmitted by the second transmitter node, the decoder having the function that is the inverse of a coder using a space-time code for which the matrix comprises as many rows as there are transmitter nodes, the first row being identical to the first frame transmitted by the first transmitter node and the second row being constructed from the preceding row by applying a circular permutation to the symbols of the preceding row and by multiplying m of the permutated symbols by a phase coefficient $\phi \neq 1$, for $0<m \leq [N/2]+1$.

This reception method and this receiver have the advantage of being adapted to a system implementing a transmission method of an embodiment of the invention.

The various above implementations may optionally be combined with one or more of those implementations in order to define other implementations.

In a preferred implementation, the steps of the transmission or reception method are determined by the instructions of a transmission or reception program incorporated in one or more electronic circuits such as chips, themselves being suitable for incorporating in electronic devices of the system. The transmission or reception method of an embodiment of the invention may equally well be implemented when the program is loaded into a calculation member such as a processor or the equivalent so that the operation thereof is then controlled by executing the program.

Consequently, an embodiment of the invention also provides a computer program, in particular a computer program on or in a data medium, and suitable for implementing an embodiment of the invention. The program may make use of any programming language, and may be in the form of source code, object code, or of a code intermediate between source and object code, such as in a partially compiled form, or in any other desirable form for implementing a method of an embodiment of the invention.

The data medium may be any entity or device capable of storing the program. For example, the medium may comprise storage means such as a read only memory (ROM), e.g. a compact disk (CD) ROM, or a microelectronic circuit ROM, or indeed magnetic recording means, e.g. a floppy disk or a hard disk.

Alternatively, the data medium may be an integrated circuit in which the program is incorporated, the circuit being adapted to execute or to be used in the execution of the method in question.

Furthermore, the program may be converted into any transmissible form such as an electrical or optical signal that may be conveyed via an electrical or optical cable, by radio, or by other means. The program of an embodiment of the invention may in particular be downloaded from an Internet type network.

BRIEF DESCRIPTION OF THE DRAWINGS

Other characteristics and advantages appear more clearly on reading the following description of particular embodiments given by way of illustrative and non-limiting example and shown in the accompanying drawings, in which.

DETAILED DESCRIPTION OF ILLUSTRATIVE EMBODIMENTS

Figure 1:
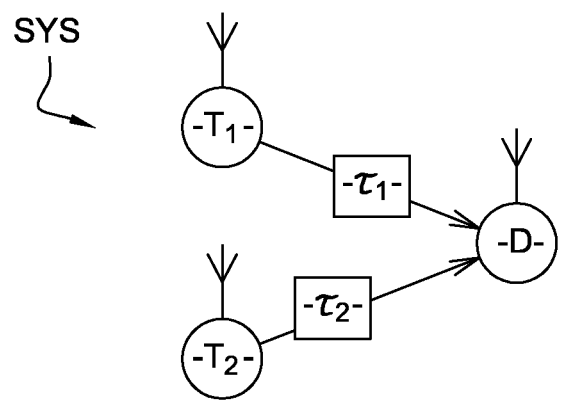
FIG. 1 is a diagram showing the basic topology of asynchronous distributed systems.

With reference to FIG. 1, which is a diagram showing the basic topology of asynchronous distributed systems SYS, consideration is given to two nodes $T_1$ and $T_2$ that are not mutually synchronized and that send the same signal to a third node D with respective time delays $\tau_1$ and $\tau_2$ (with $\Delta=\tau_2-\tau_1$). Thus, the symbols $S_i$ transmitted by the nodes $T_1$ and $T_2$ are received by the destination node D as follows:

from $T_1$: $0^{\tau_1} S_1 S_2 \ldots S_i \ldots S_N$
from $T_2$: $0^{\tau_2} S_1 S_2 \ldots S_i \ldots S_N$ where $0^{\tau_i}$ represents a vector of zeros of length $\tau_i$ (assumed to be a multiple of a symbol time). N is the size of the information frame to be sent.

This transmission scheme provides diversity of two if the time delays $\tau_1$ and $\tau_2$ are different. If the time delays are equal, the receiver D cannot distinguish between a symbol coming from a node $T_1$ and another symbol coming from the other node $T_2$. The receiver D sees one symbol subjected to overall attenuation of a single path constituted by the superposition of the paths of the two roots followed. Thus, if the nodes $T_1$ and $T_2$ become synchronous, i.e. $\tau_1=\tau_2$ ($\Delta=0$), then the diversity of the system becomes equal to one.

As a result, this transmission scheme has diversity equal to two only when $\tau_1 \neq \tau_1$ ($\Delta \neq 0$).

$N+\tau_{max}$ symbol times are needed at the destination D to receive the N symbols transmitted by the nodes $T_1$ and $T_2$, where $\tau_{max}$ is the maximum of the time delays $\tau_1$ and $\tau_2$. For long frames (large N) and assuming that the maximum delay $\tau_{max}$ is limited to a few symbol times, $\tau_{max}$ may be ignored compared with N. Under such circumstances, the coding rate is given as follows:

$$r_1 = \frac{N}{N+\tau_{max}} \underset{N \to \infty}{=} \frac{N}{N} = 1$$

A method of an embodiment of the invention enables a diversity of two to be obtained regardless of whether the two nodes are or are not synchronous. For this purpose, an embodiment of the invention lies on a novel transmission scheme based on symbol permutation. This scheme makes it possible to guarantee maximum diversity for a given range of time delays $\Delta = \tau_2 - \tau_1$, including the synchronous situation ($\Delta=0$). This permutation makes it possible to guarantee that the symbols transmitted by the nodes $T_1$ and $T_2$, corresponding to a single symbol $S_i$ do not arrive at the destination at the same time, providing the time delay $\Delta$ lies within a fixed range.

In order to make explanation easier and without loss of generality, the destination is considered as being synchronous with the node $T_1$, i.e. $\tau_1=0$, and the total number N of symbols sent is assumed to be even. The matrix of code words received by the destination D then takes the following form:

$$C = \begin{bmatrix} S_1 & S_2 & \ldots & S_{i-1} & S_i & S_{i+1} & \ldots & S_N & 0^\Delta \\ 0^\Delta & S_1 & S_2 & \ldots & S_{i-1} & S_i & S_{i+1} & \ldots & S_N \end{bmatrix}$$

This code C gives full diversity (equal to two) for all non-zero relative time delays ($\Delta=\tau_2-\tau_1\neq 0$). However, when $\Delta=0$, this mode loses its diversity, which then becomes equal to one.

Figure 2:
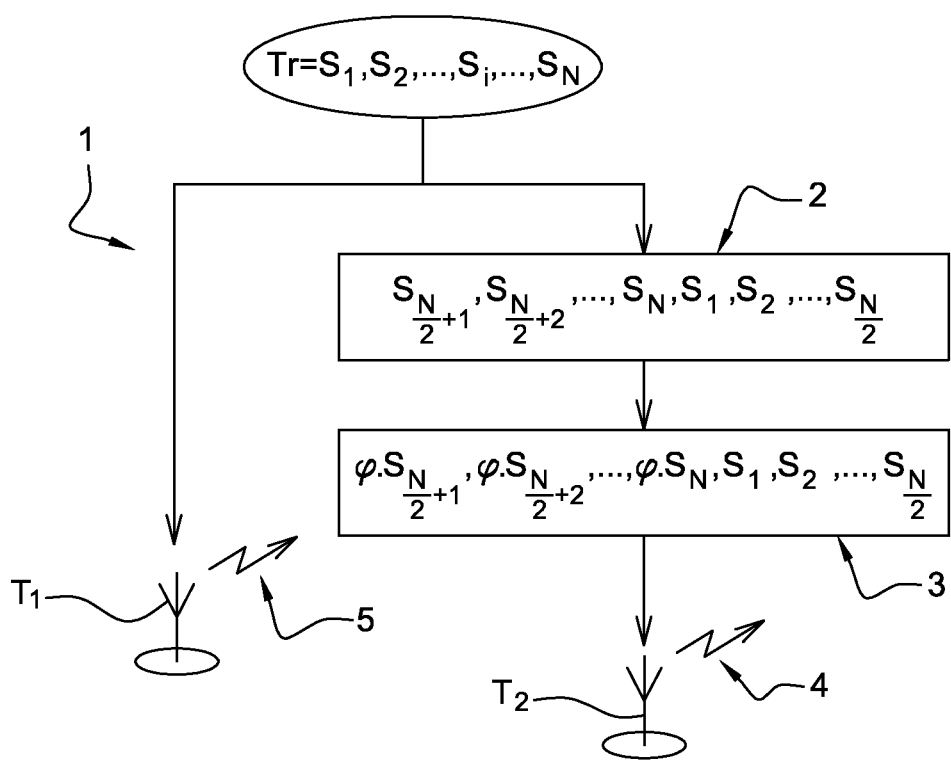
FIG. 2 is a simplified flow chart of a transmission method of an embodiment of the invention implemented by a system as shown in FIG. 1.

In order to solve this problem, a method 1 of an embodiment of the invention as shown in FIG. 2 performs a circular permutation (step 2) that amounts to shifting the symbols m times, typically to the right with m=N/2:

$$S_{\frac{N}{2}+1}, S_{\frac{N}{2}+2}, \ldots, S_N, S_1, S_2, \ldots, S_{\frac{N}{2}}$$

followed by multiplying (step 3) the N/2 first symbols by a phase coefficient $\phi$ on the code words for transmitting (step 4) by the node $T_2$ as follows:

$$\varphi \cdot S_{\frac{N}{2}+1}, \varphi \cdot S_{\frac{N}{2}+2}, \ldots, \varphi \cdot S_N, S_1, S_2, \ldots, S_{\frac{N}{2}}$$

This defines a new space-time code $C^P$ having the following matrix:

$$C^P = \begin{bmatrix} S_1 & S_2 & \ldots & S_{i-1} & S_i & S_{i+1} & \ldots & S_N \\ \varphi \cdot S_{\frac{N}{2}+1} & \varphi \cdot S_{\frac{N}{2}+2} & \ldots & \varphi \cdot S_N & S_1 & S_2 & \ldots & S_{\frac{N}{2}} \end{bmatrix}$$

The other node $T_1$ transmits (step 5) the symbols corresponding to the first row of the matrix.

Using the phase coefficient $\phi$ makes it possible to comply with the rank criterion and thus to guarantee diversity equal to two for $\Delta=0$. The determinant of the matrix $(Z^P-Z'^P) \cdot (Z^P-Z'^P)^H$ is never zero, providing the code word $Z^P$ of the code $C^P$ is different from the code word $Z'^P$ of the code $C^P$. A well chosen phase coefficient $\phi$ serves to maximize the minimum determinant for the set of all pairs of code word matrices.

An example value for $\phi$ is $$\varphi = \exp\left(j \cdot \frac{\pi}{3}\right).$$

This new space-time code $C^P$ makes it possible to guarantee diversity of two over the relative time delay range $\Delta \in \{-\Delta_{max}, +\Delta_{max}\}$ with $$\Delta_{max} = \frac{N}{2} - 1$$

for even N. The coding rate of the code is given by:

$$r = \frac{N}{N + \tau_{max}} \xrightarrow{N \to \infty} \frac{N}{N} = 1$$

The matrix of code words received by the destination is written in the form:

$$C^R_{0^\Delta} = \begin{bmatrix} S_1 & S_2 & \ldots & S_{i-1} & S_i & S_{i+1} & \ldots & S_N & 0^\Delta \\ 0^\Delta & \varphi \cdot S_{\frac{N}{2}+1} & \varphi \cdot S_{\frac{N}{2}+2} & \ldots & \varphi \cdot S_N & S_1 & S_2 & \ldots & S_{\frac{N}{2}} \end{bmatrix}$$

When N is odd, the shift is performed on m=[N/2] or on m=[N/2]+1, and the new space-time code $C^P$ makes it possible to guarantee a diversity of two over the following relative time delay ranges $\Delta \in \{-\Delta_{max}+1, +\Delta_{max}\}$ or $\Delta \in \{-\Delta_{max}, +\Delta_{max}-1\}$, respectively, with $\Delta_{max}=[N/2]$.

For example, for N=4, the matrix of code words to be transmitted by the two nodes is written in the form:

$$C = \begin{bmatrix} S_1 & S_2 & S_3 & S_4 \\ \varphi S_3 & \varphi S_4 & S_1 & S_2 \end{bmatrix}$$

If $\Delta=0$, the destination receives these code words simultaneously, and the matrix of received code words is identical to that of transmitted code words.

If $\Delta=1$, the destination receives these code words with a shift of one symbol time, and the matrix of received code words is as follows:

$$C = \begin{bmatrix} S_1 & S_2 & S_3 & S_4 & 0 \\ 0 & \varphi S_3 & \varphi S_4 & S_1 & S_2 \end{bmatrix}$$

The diversity is equal to two regardless of whether $\Delta=0$ or $\Delta=1$, since the determinant is never zero for two different code words Z and Z'.

The destination decodes the received signal while taking account of this new structure for the space-time code.

An embodiment of the invention is described above for two transmitter nodes $T_1$ and $T_2$. It may be generalized for some greater number $n_T$ of transmitter nodes. The corresponding space-time code has a matrix with as many rows as there are transmitter nodes. The matrix for $n_T$ transmitter nodes is identical to the matrix for $n_T-1$ transmitter nodes, except for the addition of an additional row. The first row is identical to the frame transmitted by the first transmitter node. The second row as described above for the two-node situation is made up of a first series of symbols $$\varphi \cdot S_{\frac{N}{2}+1}, \varphi \cdot S_{\frac{N}{2}+2}, \ldots, \varphi \cdot S_N$$

and a second series of symbols $$S_1, S_2, \ldots, S_{\frac{N}{2}}.$$

The third row is constructed as a function of the second row, and has four series of symbols, i.e. the number of series of the preceding row multiplied by two. The $1^{st}$ and the $2^{nd}$ series are constructed from the first series of the preceding row. The $3^{rd}$ and the $4^{th}$ series are constructed from the second series of the preceding row. The first series is the result of the permutation 2 and the multiplication 3 as applied to the $1^{st}$ series of the preceding row, thus giving $\varphi_1 S_{\frac{3N}{4}+1}, \varphi_1 S_{\frac{3N}{4}+2}, \ldots, \varphi_1 S_N.$ The 2$^{nd}$ series is a copy of the 1$^{st}$ half of the 1$^{st}$ series of the preceding row, thereby giving $\varphi \cdot S_{\frac{N}{2}+1}, \varphi \cdot S_{\frac{N}{2}+2}, \ldots, \varphi \cdot S_{\frac{3N}{4}}.$ The 3$^{rd}$ series is the result of the permutation 2 and the multiplication 3 applied to the 2$^{nd}$ series of the preceding row, thereby giving $\varphi_2 \cdot S_{\frac{N}{4}+1}, \varphi \cdot S_{\frac{N}{2}+2}, \ldots, \varphi \cdot S_{\frac{N}{2}}.$ The 4$^{th}$ series is the copy of the first half of the 2$^{nd}$ series of the preceding row, thereby giving $S_1, S_2, \ldots, S_{\frac{N}{4}}.$ The following rows are constructed on the same principle as the third row. There is then a relationship between the size N of the frame, the number $n_T$ of transmitter nodes, and the relative time delay range $\Delta \in \{-\Delta_{max}, +\Delta_{max}\}$ for even N for which a diversity of two is guaranteed:

$\Delta_{max} = (N/2^{(n_T-1)}) - 1$

Figure 3:
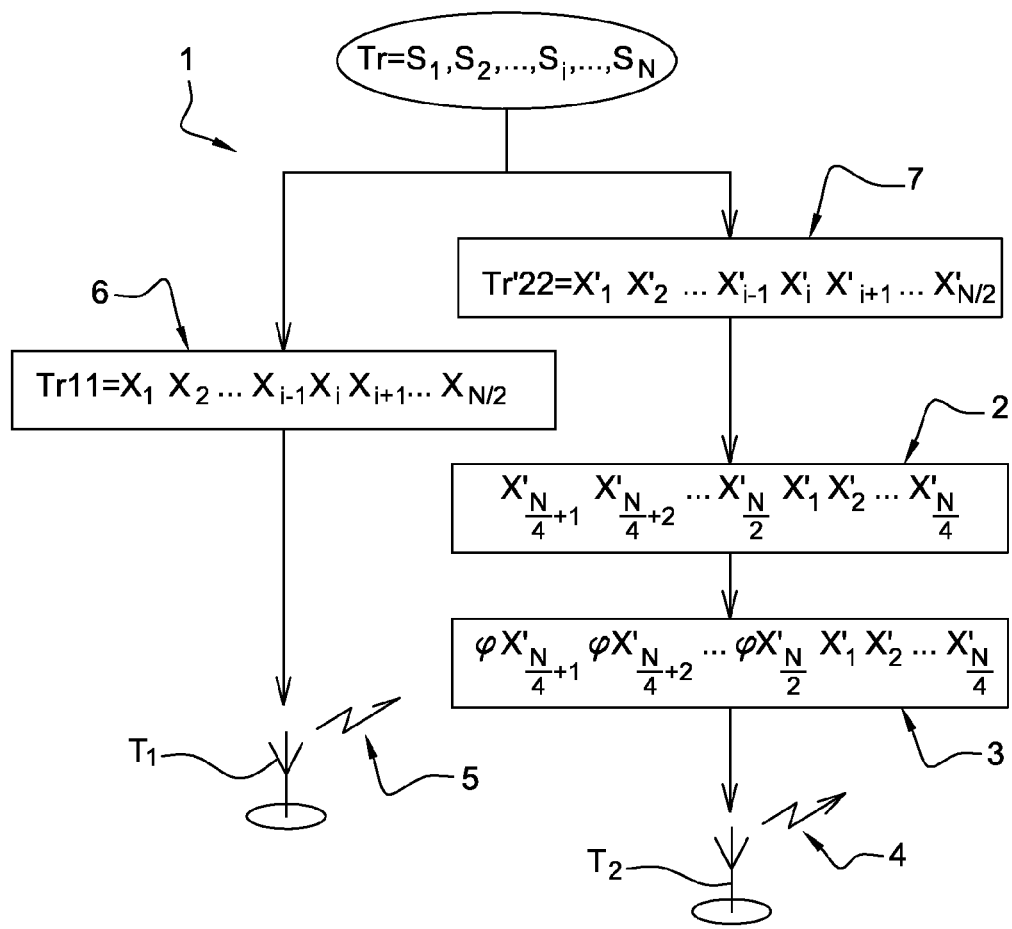
FIG. 3 is a simplified flow chart of a particular implementation of a transmission method of an embodiment of the invention implemented by a system as shown in FIG. 1.

In a particular implementation shown in FIG. 3, the method determines 6, 7 first and second new frames Tr11 and Tr'22 made up of respective symbols $X_i$ and $X'_i$ constructed by combining symbols $S_i$:

$Tr11 = X_1 X_2 \ldots X_{i-1} X_i X_{i+1} \ldots X_{N'}$ and $Tr'22 = X'_1 X'_2 \ldots X'_{i-1} X'_i X'_{i+1} \ldots X'_{N'}.$ The combination is such that the symbols $X_i$ and $X'_i$ constructed from the same symbols $S_i$ are two different points of a single constellation. The combination is such that $X_i = aS_{2i-1} + b.S_{2i}$ and $X'_i = cS_{2i-1} + d.S_{2i}$, where a, b, c, and d are complex parameters that enable the original constellations of the symbols $S_i$ to be rotated. By using this combination, the method thus makes it possible also to obtain constellation diversity, since each antenna transmits a configuration of the same symbols $S_i$ corresponding to a different point of a given constellation. By way of example, the combination comprises the 1$^{st}$ frame summing and the 2$^{nd}$ frame subtracting a pair of successive symbols $(S_i, S_{i+1})$: a=b=c=−d=1.

The circular permutation (step 2) is applied to the second new frame Tr'22 of symbols $X'_i$, thereby giving:

$X'_{\frac{N}{4}+1} \quad X'_{\frac{N}{4}+2} \quad \ldots \quad X'_{\frac{N}{2}} \quad X'_1 \quad X'_2 \quad \ldots \quad X'_{\frac{N}{4}}$ The multiplication by a phase coefficient $\phi$ (step 3) is applied to the N/4 first permutated symbols of the second new frame Tr'22 of symbols thereby giving:

$\varphi X'_{\frac{N}{4}+1} \quad \varphi X'_{\frac{N}{4}+2} \quad \ldots \quad \varphi X'_{\frac{N}{2}} \quad X'_1 \quad X'_2 \quad \ldots \quad X'_{\frac{N}{4}}$ The transmitter $T_2$ transmits (step 4) the second new frame Tr'22 of symbols $X'_i$ as permutated and multiplied by the phase coefficient.

The other transmitter $T_1$ transmits (step 5) the first new frame Tr11 of symbols $X'_i$. The matrix of the corresponding new space-time code $C^{CP}$ is as follows:

$$C^{CP} = \begin{bmatrix} X_1 & X_2 & \ldots & X_{i-1} & X_i & X_{i+1} & \ldots & X_{N/2} \\ \varphi X'_{\frac{N}{4}+1} & \varphi X'_{\frac{N}{4}+2} & \ldots & \varphi X'_{\frac{N}{2}} & X'_1 & X'_2 & \ldots & X'_{\frac{N}{4}} \end{bmatrix}$$

The matrix $C_{0^\Delta}^{CR}$ of code words received by the destination D is written in the form:

$$C_{0^\Delta}^{CR} = \begin{bmatrix} X_1 & X_2 & \ldots & X_{i-1} & X_i & X_{i+1} & \ldots & X_{\frac{N}{2}} & 0^\Delta \\ 0^\Delta & \varphi X'_{\frac{N}{4}+1} & \varphi X'_{\frac{N}{4}+2} & \ldots & \varphi X'_{\frac{N}{2}} & X'_1 & X'_2 & \ldots & X'_{\frac{N}{4}} \end{bmatrix}$$

with the 1$^{st}$ row that corresponds to the symbols transmitted by the 1$^{st}$ node $T_1$ and the 2$^{nd}$ row that corresponds to the symbols transmitted by the second node $T_2$ and delayed by $\Delta$ symbol times because of the lack of synchronization.

The destination decodes the received signal while taking account of the space-time code $C^{CP}$ and of the relative time delay $\Delta$.

In a particular implementation, a=1, b=$\theta$, c=1, and d=−$\theta$. The symbols $S_i$ are combined as follows:

$X_i = S_{2i-1} + \theta \cdot S_{2i}$ and $X'_i = S_{2i-1} - \theta \cdot S_{2i}$ $\left(i = 1, \ldots, \frac{N}{2}\right); \theta = \exp(j \cdot \phi) = e^{j\phi}$ In this implementation, the new symbols $X_i = S_{2i-1} + \theta.S_{2i}$ and $X'_i = S_{2i-1} - \theta.S_{2i}$, which are indeed two different points of a given constellation, are transmitted respectively by the two nodes $T_1$ and $T_2$. The size of the frames for transmission is thus N'=N/2. This is also the length of the space-time code $C^{CP}$. This makes it possible to guarantee full diversity in a network having two antennas transmitting to the same destination antenna, for a time delay between the two transmitting antennas lying in a range $\Delta \in \{-\Delta_{max}, +\Delta_{max}\}$ that varies as a function of the size N' of the code.

For even N', the absolute value of the maximum time delay that the code can accommodate is: $\Delta_{max} = (N'/2) - 1$. If N' is odd, the maximum time delay that the code can accommodate is: $\Delta_{max} = [N'/2]$ where [x] denotes the integer portion of x. Thus, in order to increase the range that can be accommodated, it suffices to increase the size N' of the code.

The following example for N=8 and $\Delta$=0 serves to illustrate this implementation. The symbols for transmission are $S_1, S_2, S_3, S_4, S_5, S_6, S_7, S_8$ and the matrix of the space-time code (with N'=N/2=4) is:

$$C^{CP} = \begin{bmatrix} X_1 & X_2 & X_3 & X_4 \\ \varphi X_3' & \varphi X_4' & X_1' & X_2' \end{bmatrix}$$

with $X_1 = S_1 + \theta.S_2$ $X_2 = S_3 + \theta.S_4$ $X_3 = S_5 + \theta.S_6$ $X_4 = S_7 + \theta.S_8$ and $X'_1 = S_1 - \theta.S_2$ $X'_2 = S_3 - \theta.S_4$ $X'_3 = S_5 - \theta.S_6$ $X'_4 = S_5 - \theta.S_8$ The selected rotation corresponds to an angle of 45 degrees. This therefore gives:

$$\theta = \exp\left(j \cdot \frac{\pi}{4}\right) = \exp(j \cdot 45°).$$

This value for the angle of rotation minimizes the pairwise error probability for a 4 QAM or 16 QAM type constellation of $S_i$. The phase coefficient $\varphi$ is selected to be equal to $$\varphi = \exp\left(j \cdot \frac{\pi}{6}\right).$$

The following selection of parameters:

$$a = \frac{1}{\sqrt{5}}(1 + j - j\theta),\ b = \frac{1}{\sqrt{5}}(1 + j - j\theta) \cdot \theta,\ c = \frac{1}{\sqrt{5}}(1 + j\theta),$$

$$d = \frac{1}{\sqrt{5}}(1 + j\theta)(1 - \theta) \text{ with}$$

$$\theta = \frac{1 + \sqrt{5}}{2} \text{ and } \varphi = j$$

corresponds to the parameters of the Golden Code [5] and is particularly suitable for synchronous systems while guaranteeing a diversity of two for asynchronous systems.

The example below serves to illustrate how a method of an embodiment of the invention can be implemented by a time division multiple access (TDMA) system. The information symbols are concatenated in frames and they are transmitted in series. By way of example, taking a code length equal to N'=N/2=8, the following N symbols are to be transmitted: $S_1$, $S_2$, ..., $S_{16}$. The symbols $S_i$ (i=1, ..., N) are assumed to belong to quadrature phase shift keying (QPSK) modulation. By using the new space-time code $C^{CP}$ (rotation through 45 degrees $$\theta = \exp\left(j \cdot \frac{\pi}{4}\right) = \exp(j \cdot 45°)),$$

the matrices of code words received by the destination for the various time delays between the two antennas $T_1$ and $T_2$, with the destination having a priori knowledge of the relative time delay $\Delta$, are as follows:

$$C_0^{RC} = C^{CP} = \begin{bmatrix} X_1 & X_2 & X_3 & X_4 & X_5 & X_6 & X_7 & X_8 \\ \varphi X_5' & \varphi X_6' & \varphi X_7' & \varphi X_8' & X_1' & X_2' & X_3' & X_4' \end{bmatrix}$$

Time delay of one symbol time ($\Delta=1$):

$$C_1^{RC} = \begin{bmatrix} X_1 & X_2 & X_3 & X_4 & X_5 & X_6 & X_7 & X_8 & 0 \\ 0 & \varphi X_5' & \varphi X_6' & \varphi X_7' & \varphi X_8' & X_1' & X_2' & X_3' & X_4' \end{bmatrix}$$

Time delay of two symbol times ($\Delta=2$):

$$C_2^{RC} = \begin{bmatrix} X_1 & X_2 & X_3 & X_4 & X_5 & X_6 & X_7 & X_8 & 0 & 0 \\ 0 & 0 & \varphi X_5' & \varphi X_6' & \varphi X_7' & \varphi X_8' & X_1' & X_2' & X_3' & X_4' \end{bmatrix}$$

Time delay of three symbol times ($\Delta=3$):

$$C_3^{RC} = \begin{bmatrix} X_1 & X_2 & X_3 & X_4 & X_5 & X_6 & X_7 & X_8 & 0 & 0 & 0 \\ 0 & 0 & 0 & \varphi X_5' & \varphi X_6' & \varphi X_7' & \varphi X_8' & X_1' & X_2' & X_3' & X_4' \end{bmatrix}$$

Where $X_i = S_{2i-1} + \theta.S_{2i}$ and $X'_i = S_{2i-1} - \theta.S_{2i}$.

The use of the code $C^{CP}$ by the transmitters (each transmitter transmitting one row) makes it possible to guarantee full diversity (diversity of two) for a maximum time delay equal to $$\Delta_{max} = \frac{N'}{2} - 1 = 3.$$

The method thus makes it possible to guarantee a diversity equal to two for the following range of time delays $\Delta = -3, -2, -1, 0, 1, 2, 3$. In order to increase the range of time delays over which the diversity is equal to two, it is necessary to increase the size N' of the code.

The destination decodes the received signal while taking account of the space-time code $C^{CP}$ and of the relative time delay $\Delta$, and thus making use of the following matrices: $C_0^{RC}$, $C_1^{RC}$, $C_2^{RC}$, or $C_3^{RC}$.

Figure 4:
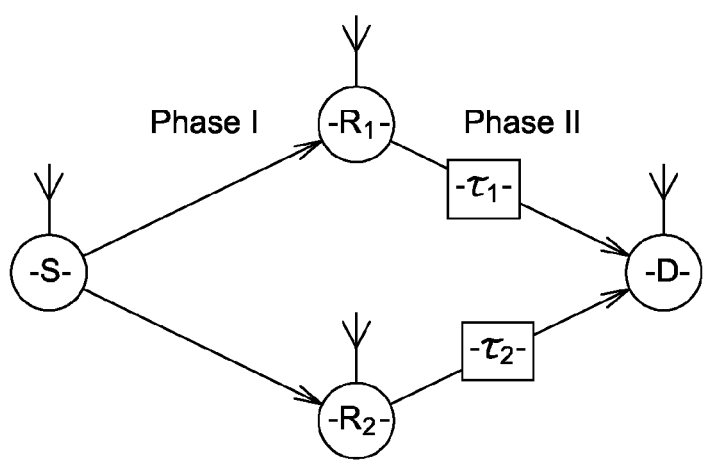
FIG. 4 is a diagram showing the basic topology of asynchronous distributed systems with relays.

The following example serves to illustrate how a method of an embodiment of the invention is implemented by a co-operative asynchronous system having relays as shown in FIG. 4. The system SYS comprises a source S, two relays $R_1$ and $R_2$, and a destination D. Each node/relay has a single antenna for data transmission which means that it cannot transmit and receive at the same time. A direct link between the source S and the destination D does not exist, e.g. because of a distance between them that is too great. The relays use the decode-and-forward (DF) protocol for relaying the received signal.

The transmission period is subdivided into two phases t1 and t2. During the first phase t1, the source S transmits its message to the relays $R_1$ and $R_2$ and it does not transmit during the second phase t2. The relays $R_1$ and $R_2$ that manage to decode the signal from the source S without error then transmit the signal to the destination D during the second phase t2. Because of the distributed nature of the network, different time delays are introduced by the relays $R_1$ and $R_2$, written respectively $\tau_1$ and $\tau_2$. The relative time delay between the two relays is thus: $\Delta = \tau_2 - \tau_1$. Implementing a method of an embodiment of the invention amounts to considering the relays $R_1$ and $R_2$ as the nodes of the system shown in FIG. 1: the transmission and reception schemes described with reference to FIGS. 2 and 3 are the same.

The example below serves to illustrate the implementation of a method of an embodiment of the invention by an asynchronous co-operative system of the orthogonal frequency division multiple access (OFDMA) type. A system of the OFDMA type is such that the information symbols for transmission are transmitted on orthogonal frequencies by using an OFDM multiplexer on transmission that is based on a reverse Fourier transform. The result of this modulation is referred to as an "OFDM symbol", and its duration is written $T_{ofdm}$. Before transmitting this OFDM symbol, a cyclic prefix is added to absorb the time delays due to the channel and to make it possible on reception to separate the shortest path from the other paths after performing demodulation by means of a fast Fourier transform (FFT). For this purpose, the cyclic prefix (or guard interval) of a conventional OFDMA system needs to be of the same order as the maximum delay between the various paths. Nevertheless, if the delay of a path is longer than the cyclic prefix, it will be considered as being interference.

The OFDMA type asynchronous co-operative system under consideration has topology as shown in FIG. 1. Implementing a method of an embodiment of the invention amounts to each node of the OFDMA type asynchronous co-operative system transmitting a single row of the code matrix on a subcarrier:

$$C^{CP} = \begin{bmatrix} X_1 & X_2 & X_3 & X_4 & X_5 & X_6 & X_7 & X_8 \\ \varphi X_5' & \varphi X_6' & \varphi X_7' & \varphi X_8' & X_1' & X_2' & X_3' & X_4' \end{bmatrix}$$

Thus, the OFDM multiplexer of each node multiplexes one of the frames (one of the rows of the code matrix) on a respective one of the subcarriers of the multiplexer. The data for sending may be formatted as a plurality of successive frames that are routed in parallel by the OFDM multiplexer on other subcarriers.

Taking account of the cyclic prefix $T_{pc}$ or the guard interval having a suitable length, the assumption that consists in considering the channel between the nodes and the destination as being a single-path channel is not limiting. Depending on the relative time delay $\Delta$ for transmission between one of the nodes and the destination, one of the following scenarios occurs:

if $\Delta$ is less than the cyclic prefix duration $T_{pc}$ (or the guard interval), then the destination sees the code $C_0^{RC}=C^{CP}$ per subcarrier; or if $\Delta$ is greater than the duration of the cyclic prefix (or of the guard interval), then it suffices for it to lie in the range $k.T_{ofdm}$ to $k.T_{ofdm}+T_{pc}$ for the receiver to see the code $C_k^{CR}$ per subcarrier, where k is an integer and where:

$$C_k^{CR} = \begin{bmatrix} X_1 & X_2 & X_3 & X_4 & X_5 & X_6 & X_7 & X_8 & 0^k \\ 0^k & \varphi X_5' & \varphi X_6' & \varphi X_7' & \varphi X_8' & X_1' & X_2' & X_3' & X_4' \end{bmatrix}$$

An OFDMA type asynchronous co-operative system implementing the space-time code of an embodiment of the invention has the following advantages:

reducing the constraints on synchronization between the nodes $T_1$ and $T_2$, since it suffices for the relative time delay $\Delta$ to lie in one of the ranges $[k.T_{ofdm}; k.T_{ofdm}+T_{pc}]$ for the destination to be able to decode the received code. Whereas without this new space-time code, it is necessary for the relative delay $\Delta$ to be less than $T_{pc}$:

enabling the duration of the cyclic prefix to be reduced, enabling it to be matched to the relative time delay $\Delta$ and not to the maximum value of the time delays between a node and the destination. With this sole constraint on the cyclic prefix, it is always possible to decode the signal on reception with a diversity of two.

REFERENCES

[1]: V. Tarokh, N. Seshadri, and A. R. Calderbank, "Space-Time Codes for High Data Rate Wireless Communication: Performance Criterion and Code Construction," IEEE Transactions on Informormation Theory, vol. 44, pp. 744-765, March 1998.

[2]: S. M. Alamouti, "A Simple Transmitter Diversity Scheme for Wireless Communications," IEEE J. Select. Areas Commun., vol. 16, pp. 1451-1458, October 1998.

[3]: M. O. Damen and A. R. Hammons, "Delay-Tolerant Distributed TAST Codes for Cooperative Diversity," IEEE Transactions on Information Theory, special issue on cooperative diversity, vol. 53, pp. 3755-3773, October 2007.

[4]: John A. C. Bingham, "Multicarrier Modulation for Data Transmission: An Idea Whose Time Has Come", May 1990, IEEE Communications Magazine.

[5]: J-C. Belfiore, G. Rekaya and E. Viterbo, "The Golden Code: A 2×2 Full-Rate Space-Time Code with Non-Vanishing Determinants", IEEE International Symposium on Information Theory (ISIT), Chicago, USA, July 2004.

The invention claimed is:

1. A method of transmitting frames of N>2 symbols $S_i$ for use in a distributed system having at least two transmitter nodes, the method comprising:
   circularly permutating a frame of N symbols $S_i$;
   multiplying m first permutated symbols by a phase coefficient $\phi \neq 1$, for $0<m \leq [N/2]+1$; and
   one of the nodes transmitting the frame comprising the multiplied permutated symbols and another of the nodes transmitting the frame of N symbols $S_i$.

2. A method according to claim 1, wherein the at least two transmitter nodes transmit according to the OFDMA type of transmission and wherein the frame transmitted by a node is multiplexed on a subcarrier.

3. A method of transmitting frames of N>2 symbols $S_i$ for use in a distributed system having at least two transmitter nodes, the method comprising:
   determining first and second new frames comprising respective symbols $X_i$ and $X'_i$ constructed by combining symbols $S_i$ of a frame, the two symbols $X_i$ and $X'_i$ constructed from the same symbols determining two different points of a given constellation;
   circularly permutating the second new frame of N constructed symbols $X'_i$;
   multiplying m first permutated constructed symbols by a phase coefficient $\phi \neq 1$, for $0<m \leq [N/2]+1$;
   one of the nodes transmitting permutated and multiplied symbols; and
   another node transmitting the first new frame of N constructed symbols $X_i$.

4. A method according to the claim 2, wherein the first new frame comprises the symbols $X_i$ such that $X_i=S_{2i-1}+\theta.S_{2i}$ and the second new frame comprises the symbols $X'_i$ such that $X'_i=S_{2i-1}-\theta.S_{2i}$.

5. A method according to preceding claim 2, wherein $$\theta = \exp\left(j \cdot \frac{\pi}{4}\right).$$

6. A method according to claim 3, wherein the at least two transmitter nodes transmit according to the OFDMA type of transmission and wherein the frame transmitted by a node is multiplexed on a subcarrier.

7. A distributed transmission system having at least three nodes including two transmitter nodes for transmitting frames of N symbols, the system comprising:
circular permutation means for circularly permutating a frame of N symbols; and
multiplier means for multiplying m first permutated symbols by a phase coefficient $\phi \neq 1$, for $0 < m \leq [N/2]+1$;
and such that:
one of the transmitter nodes has means for transmitting the frame of multiplied permutated symbols; and
another of the transmitter nodes has means for transmitting the frame of N symbols.

8. A distributed system according to claim 7, wherein the distributed system is of the OFDMA type, wherein each of the two transmitter nodes includes an OFDMA multiplexer with a plurality of subcarriers and which multiplexes one of the frames on one of the subcarriers.

9. A non-transitory data medium device including program instructions adapted to implement a method of transmitting a digital signal comprising frames of N>2 symbols $S_i$ when said program is loaded in and executed by a distributed system having at least two transmitter nodes, wherein the method comprises:
circularly permutating a frame of N symbols $S_i$;
multiplying m first permutated symbols by a phase coefficient $\phi \neq 1$, for $0 < m \leq [N/2]+1$; and
one of the nodes transmitting the frame comprising the multiplied permutated symbols and another of the nodes transmitting the frame of N symbols $S_i$.

10. A relay for an OFDMA type distributed transmission system, the relay comprising:
circular permutation means for circularly permutating frame of $N \geq 2$ symbols;
multiplication means for multiplying m first permutated symbols by a phase coefficient $\phi \neq 1$, for $0 < m \leq [N/2]+1$; and
an OFDMA multiplexer with a plurality of subcarriers for multiplexing the frame of permutated symbols having the m phase-shifted symbols on one of the subcarriers of the multiplexer.

11. A method of receiving frames of N symbols for use in a distributed system having at least three nodes including two transmitter nodes, the method comprising:
decoding a received frame resulting from the transmission of at least a first frame transmitted by the first transmitter node and at least a second frame transmitted by the second transmitter node using a space-time code for which the matrix comprises as many rows as there are transmitter nodes, the first row being identical to the first frame transmitted by the first transmitter node and the second row being constructed from the preceding row by applying a circular permutation to the symbols of the preceding row and by multiplying m of the permutated symbols by a phase coefficient $\phi \neq 1$, for $0 < m \leq [N/2]+1$.

12. A receiver for receiving frames of N symbols, for use in a distributed system having at least three nodes including transmitter nodes and the receiver, the receiver comprising:
a decoder for decoding a received frame resulting from the transmission of at least a first frame transmitted by the first transmitter node and at least a second frame transmitted by the second transmitter node, the decoder having a function that is the inverse of a coder using a space-time code for which the matrix comprises as many rows as there are transmitter nodes, the first row being identical to the first frame transmitted by the first transmitter node and the second row being constructed from the preceding row by applying a circular permutation to the symbols of the preceding row and by multiplying m of the permutated symbols by a phase coefficient $\phi \neq 1$, for $0 < m \leq [N/2]+1$.

13. A non-transitory data medium device including program instructions adapted to implement a method of transmitting frames of N>2 symbols $S_i$ when said program is loaded in and executed by a distributed system having at least two transmitter nodes, wherein the method comprises:
determining first and second new frames comprising respective symbols $X_i$ and $X'_i$ constructed by combining symbols $S_i$ of a frame, the two symbols $X_i$ and $X'_i$ constructed from the same symbols determining two different points of a given constellation;
circularly permutating the second new frame of N constructed symbols $X'_i$;
multiplying m first permutated constructed symbols by a phase coefficient $\phi \neq 1$, for $0 < m \leq [N/2]+1$;
one of the nodes transmitting permutated and multiplied symbols; and
another node transmitting the first new frame of N constructed symbols $X_i$.

* * * * *

UNITED STATES PATENT AND TRADEMARK OFFICE
CERTIFICATE OF CORRECTION

PATENT NO. : 9,071,292 B2
APPLICATION NO. : 13/522108
DATED : June 30, 2015
INVENTOR(S) : Ahmed Saadani et al.

Page 1 of 1

It is certified that error appears in the above-identified patent and that said Letters Patent is hereby corrected as shown below:

In the Specification

In column 11, lines 16-17, delete "$\varphi_2 \cdot S_{\frac{N}{4}+1}, \varphi \cdot S_{\frac{N}{2}+2}, \ldots, \varphi \cdot S_{\frac{N}{2}}$" and insert -- $\varphi_2 \cdot S_{\frac{N}{4}+1}, \varphi_2 \cdot S_{\frac{N}{4}+2}, \ldots, \varphi_2 \cdot S_{\frac{N}{2}}$ --.

In column 13, lines 13-17, delete
"$X'_1 = S_1 - \theta.S_2$
$X'_2 = S_3 - \theta.S_4$
$X'_3 = S_5 - \theta.S_6$
$X'_4 = S_5 - \theta.S_8$"

and insert
-- $X'_1 = S_1 - \theta.S_2$
$X'_2 = S_3 - \theta.S_4$
$X'_3 = S_5 - \theta.S_6$
$X'_4 = S_7 - \theta.S_8$ --.

In column 14, before line 1, insert
-- $\Delta = 0$ : --.

Signed and Sealed this
Twenty-sixth Day of April, 2016

Michelle K. Lee
*Director of the United States Patent and Trademark Office*